(12) United States Patent
Leen et al.

(10) Patent No.: US 12,346,854 B2
(45) Date of Patent: Jul. 1, 2025

(54) DEVICES, METHODS, AND SYSTEMS FOR MULTI-USER COMMISSIONING

(71) Applicant: Honeywell International Inc., Charlotte, NC (US)

(72) Inventors: Cary Leen, Hammond, WI (US); Andrew David Halford, Manchester, MD (US); Roy Alan Kolasa, Kansas City, MO (US); Vinay Prasad, Bangalore (IN); Jayaprakash Meruva, Bangalore (IN); Evan John Kingston, Brisbane (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 671 days.

(21) Appl. No.: 17/321,187

(22) Filed: May 14, 2021

(65) Prior Publication Data
US 2021/0326799 A1    Oct. 21, 2021

Related U.S. Application Data

(63) Continuation of application No. 15/189,912, filed on Jul. 8, 2016, now abandoned.

(51) Int. Cl.
*G06Q 10/0631* (2023.01)
*G05B 15/02* (2006.01)
(Continued)

(52) U.S. Cl.
CPC ..... *G06Q 10/063118* (2013.01); *G05B 15/02* (2013.01); *G05B 19/041* (2013.01);
(Continued)

(58) Field of Classification Search
None
See application file for complete search history.

(56) References Cited

U.S. PATENT DOCUMENTS 8,725,298 B2    5/2014  Wallaert
9,734,295 B1 *  8/2017  Movva .................. A61B 5/747
(Continued)

FOREIGN PATENT DOCUMENTS

CN    101374357 A    2/2009
CN    102331525 A    1/2012
(Continued)

OTHER PUBLICATIONS

Chinese Third Office Action, CN Application No. 201780042586.X, Jan. 10, 2023 (English Translation) (7 pgs).
(Continued)

*Primary Examiner* — Tonia L Dollinger
*Assistant Examiner* — Ishrat Rashid
(74) *Attorney, Agent, or Firm* — Seager, Tufte & Wickhem, LLP

(57) ABSTRACT

Devices, methods, and systems for multi-user commissioning are described herein. One system includes a mobile computing device comprising computer readable instructions stored thereon that are executable by a processor to: retrieve configuration data for a physical controller from a remote database, install the configuration data on the physical controller, receive data associated with a status of the physical controller after the configuration data is installed on the physical controller, and synchronize the data associated with the status of the physical controller with the remote database.

18 Claims, 8 Drawing Sheets

(51) Int. Cl.
*G05B 19/04* (2006.01)
*G05B 19/042* (2006.01)
*G06F 16/27* (2019.01)
*G06F 16/955* (2019.01)
*H04L 67/52* (2022.01)
*H04W 4/02* (2018.01)

(52) U.S. Cl.
CPC ......... *G05B 19/042* (2013.01); *G06F 16/275* (2019.01); *G06F 16/9554* (2019.01); *G05B 19/0428* (2013.01); *H04L 67/52* (2022.05); *H04W 4/02* (2013.01)

(56) References Cited

U.S. PATENT DOCUMENTS

| | | | |
|---|---|---|---|
| 2004/0215669 A1 | 10/2004 | Mettala et al. | |
| 2005/0061586 A1* | 3/2005 | Engel | B66B 1/34 187/391 |
| 2006/0087402 A1 | 4/2006 | Manning et al. | |
| 2006/0263912 A1* | 11/2006 | Arroyo | G01K 7/425 374/10 |
| 2006/0282498 A1 | 12/2006 | Muro | |
| 2007/0037522 A1* | 2/2007 | Liu | H04N 21/42226 455/68 |
| 2009/0303225 A1 | 12/2009 | Kang et al. | |
| 2009/0313225 A1 | 12/2009 | Nordlinger | |
| 2011/0087988 A1 | 4/2011 | Ray et al. | |
| 2011/0118880 A1 | 5/2011 | Diwakar et al. | |
| 2012/0063354 A1 | 3/2012 | Vanga et al. | |
| 2012/0299747 A1 | 11/2012 | Schubert et al. | |
| 2012/0330849 A1 | 12/2012 | Nielsen et al. | |
| 2013/0073690 A1 | 3/2013 | Desalvo et al. | |
| 2013/0141223 A1* | 6/2013 | Brandsma | G06K 7/01 340/10.51 |
| 2013/0179354 A1 | 7/2013 | Seat | |
| 2014/0061293 A1 | 3/2014 | Jayaprakash et al. | |
| 2014/0129277 A1 | 5/2014 | Lavrov et al. | |
| 2014/0262130 A1 | 9/2014 | Yenni et al. | |
| 2014/0262134 A1 | 9/2014 | Arensmeier et al. | |
| 2014/0266639 A1 | 9/2014 | Zises | |
| 2014/0266755 A1 | 9/2014 | Arensmeier et al. | |
| 2014/0282257 A1 | 9/2014 | Nixon et al. | |
| 2014/0358285 A1 | 12/2014 | Aggarwal et al. | |
| 2015/0169791 A1 | 6/2015 | Lavrov et al. | |
| 2016/0100437 A1 | 4/2016 | Armstrong et al. | |
| 2016/0132046 A1 | 5/2016 | Beoughter et al. | |
| 2016/0327296 A1* | 11/2016 | Leising | H04L 67/02 |
| 2017/0097619 A1* | 4/2017 | Welingkar | H04L 67/125 |
| 2017/0343991 A1* | 11/2017 | Green | G05B 19/4183 |
| 2022/0094610 A1* | 3/2022 | Sundermeyer | G06F 3/0482 |

FOREIGN PATENT DOCUMENTS

| | | | |
|---|---|---|---|
| CN | 102520922 A | 6/2012 | |
| CN | 104883794 A | 9/2015 | |
| GB | 2541040 A | 2/2017 | |
| WO | WO-2015168543 A1 * | 11/2015 | ......... G05B 19/0426 |

OTHER PUBLICATIONS

"AMS Suite: Intelligent Device Manager with the DeltaV™ System", http://www2.emersonprocess.com/siteadmincenter/PM%20As~set%20Optimization%20Documents/ProductDataSheets/amsdm_ds_amsdeltav.PDF, Apr. 2015, 5 pp.

International Search Report and Written Opinion from related PCT Application No. PCT/US2017/038736, dated Oct. 17, 2017, 12 pages.

European Office Action, Application No. 17824697.1 pp. 4, Oct. 6, 2020.

Chinese First Office Action, CN Application No. 201780042586.X, Sep. 15, 2021 (English Translation) (7 pgs).

* cited by examiner

Fig. 3B

DEVICES, METHODS, AND SYSTEMS FOR MULTI-USER COMMISSIONING

This application is a continuation of co-pending U.S. patent application Ser. No. 15/189,912, filed Jul. 8, 2016, and entitled DEVICES, METHODS, AND SYSTEMS FOR MULTIUSER COMMISSIONING, which is incorporated herein by reference.

TECHNICAL FIELD

The present disclosure relates to devices, methods, and systems for multi-user commissioning.

BACKGROUND

A database can be utilized to store data for a particular project. For example, the database can be utilized to store data relating the progress or completion of the particular project. In addition, the database can be utilized to store information that can be utilized by technicians or other users that are attempting to complete the particular project. For example, the database can be utilized to store schematics and other technical information for completing the particular project. In some examples it can be difficult to maintain real time data with the database. For example, the stored information may be limited to a single user access and update.

BRIEF DESCRIPTION OF THE DRAWINGS

FIG. 3B is an example of displays for multi-user commissioning according to one or more embodiments of the present disclosure.

DETAILED DESCRIPTION

Figure 1:
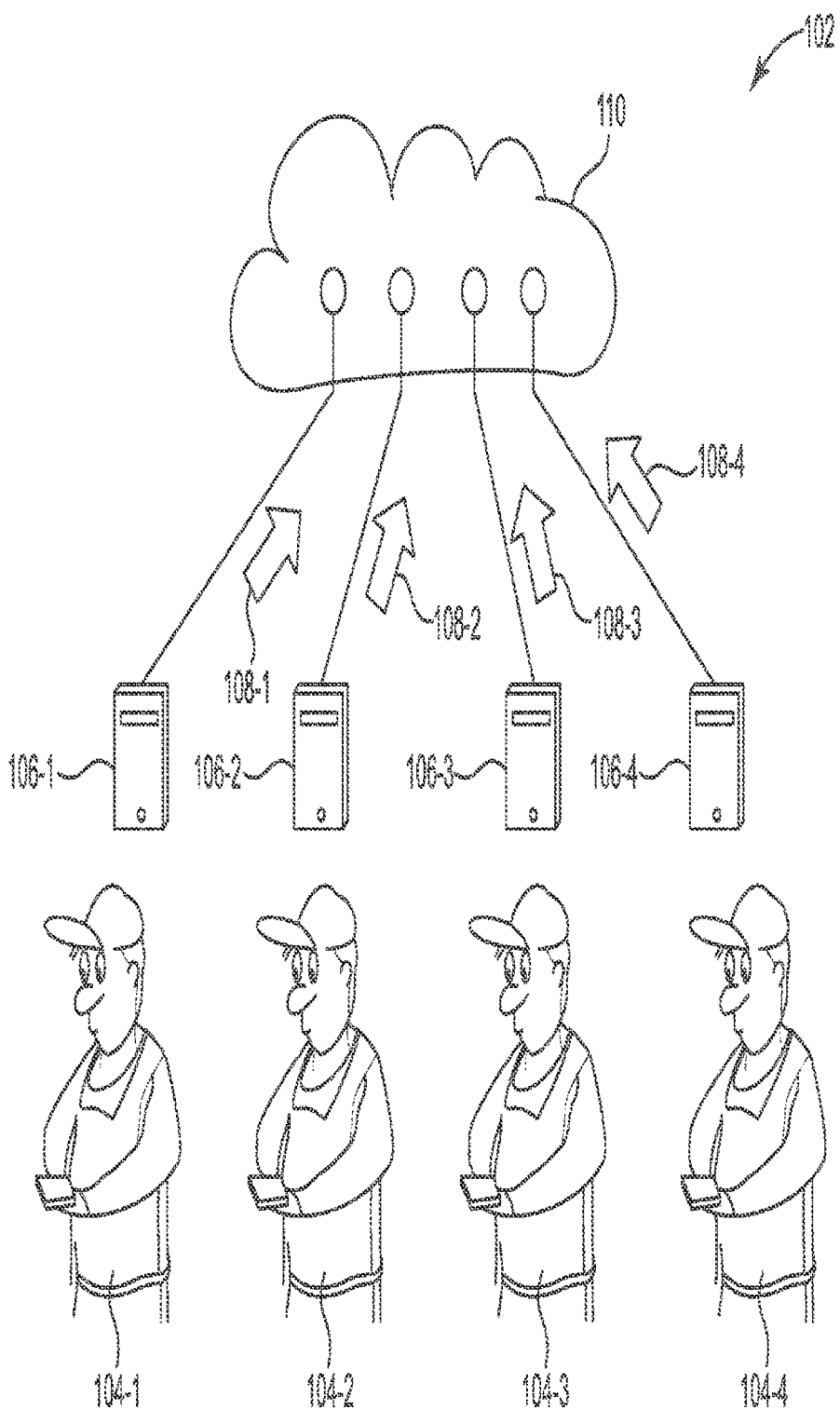
FIG. 1 is an example of a system for multi-user commissioning according to one or more embodiments of the present disclosure.

Devices, methods, and systems for multi-user commissioning are described herein. One system includes a mobile computing device comprising computer readable instructions stored thereon that are executable by a processor to: retrieve configuration data for a physical controller from a remote database, install the configuration data on the physical controller, receive data associated with a status of the physical controller after the configuration data is installed on the physical controller, and synchronize the data associated with the status of the physical controller with the remote database.

In another example, a mobile computing device can include instructions to: download project instructions for a project from a remote distributed database, generate a project checklist for the project based on the project instructions and information scanned from a device associated with the project, receive selectable inputs corresponding to the project checklist, and synchronize inputs for the project checklist with the remote distributed database.

Devices, methods, and systems for multi-user commissioning described herein can utilize a distributed database to provide two way data communication between the distributed database and a plurality of mobile computing devices. In some examples, the mobile computing devices can update an application on the mobile computing device via the two way data communication. In some examples, the mobile computing device can update data relating to a project (e.g., construction project, etc.) via the application on the mobile computing device. In some examples, the data relating to the project can be synchronized with project data within the distributed database.

In some examples, the mobile computing device can download data associated with the project. In some examples, the data associated with the project can include configuration data. In some examples, the configuration data configures a number of settings for functionality of the physical controller upon being installed on the physical controller. For example, the mobile computing device can download binary files to configure a physical controller by uploading the binary files to the physical controller. In this example, the mobile computing device can download the configuration data from the distributed database and install the configuration data on the physical controller.

In some examples, the mobile computing device can request configuration data based on information scanned from a physical controller. For example, a user can scan a code located on the physical controller or box of the physical controller. In this example, the mobile computing device can request the configuration data for the physical controller based on the scan of the code.

In some examples, the mobile computing device can be utilized to display a project checklist based on project information stored at the distributed database. In some examples, the project checklist can include a number of selectable inputs. In some examples, the number of selectable inputs can correspond to a number of project tasks that a user may complete prior to completing the project. For example, the number of project tasks can include a wiring checkout, a sensor calibration, and/or a sequence validation of test results, among other project tasks that are associated with the project.

Devices, methods, and systems for multi-user commissioning described herein can be utilized to enable a plurality of users to perform commissioning activities for the project. For example, a plurality of users can each utilize a mobile computing device that can be utilized to download project information and synchronize data associated with the status of physical controllers and/or project checklists with the distributed database.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 is an example of a system 102 for multi-user commissioning according to one or more embodiments of the present disclosure. The system 102 can utilize a network 110 to allow a plurality of users 104-1, 104-2, 104-3, 104-4 with mobile computing devices 106-1, 106-2, 106-3, 106-4 to communicate with a distributed database. In some examples, the mobile computing devices 106-1, 106-2, 106-3, 106-4 can simultaneously communicate with the distributed database via communication paths 108-1, 108-2, 108-3, 108-4.

In some examples, the network 110 can be a cloud network that is coupled to the distributed database. As described herein, the plurality of users 104-1, 104-2, 104-3, 104-4 can utilize the mobile computing devices 106-1, 106-2, 106-3, 106-4 to: retrieve configuration data for a physical controller from the distributed database, install the configuration data on the physical controller, receive data associated with a status of the physical controller after the configuration data is installed on the physical controller, synchronize the data associated with the status of the physical controller with the remote database, among other functions to help the plurality of users 104-1, 104-2, 104-3, 104-4 complete the project and/or update a status of the project. In some examples, data associated with a status of the physical controller includes installation instructions for the physical controller and checkout instructions for the physical controller.

The system 102 can allow the plurality of users 104-1, 104-2, 104-3, 104-4 access data relating to the project via the mobile computing devices 106-1, 106-2, 106-3, 106-4 and update the distributed database with a completed tasks relating to the project by synchronizing the mobile computing devices 106-1, 106-2, 106-3, 106-4 with the distributed database via the network 110.

In some examples, the system 102 can allow the plurality of users 104-1, 104-2, 104-3, 104-4 to simultaneously update a status of the project. In some examples, the project can include a plurality of sub-projects and/or portions of the project. In some examples, a first user 104-1 can download information for a first portion of the project and a second user 104-2 can download information for a second portion of the project. In this example, the first user 104-1 and the second user 104-2 can synchronize the respective portion of the project simultaneously. In some examples, it can be advantageous to have real time status of the project to determine a timeline for completion of the project, determine when a different user can begin a project, and/or resources that may be needed for completion of the project.

Figure 2:
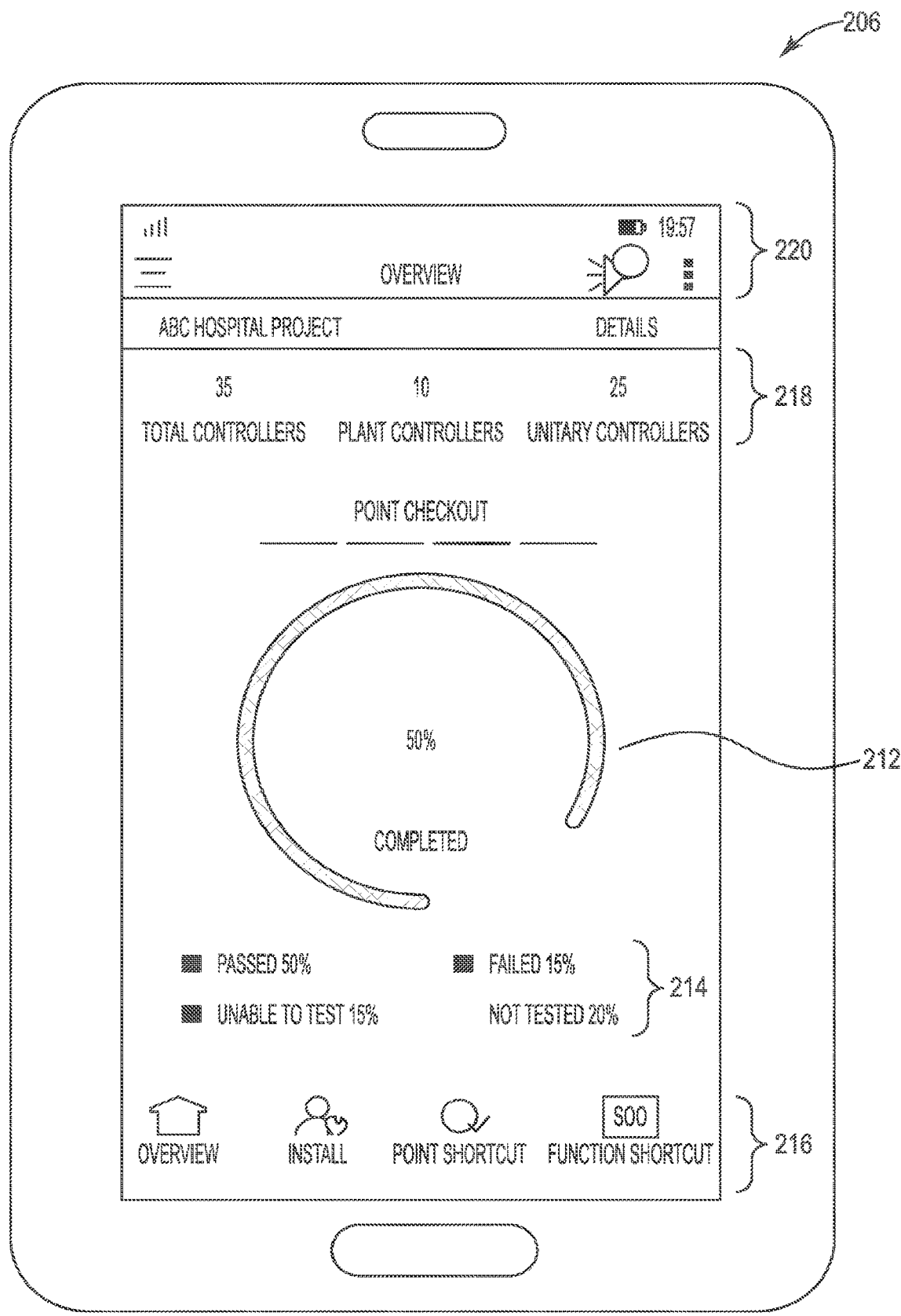
FIG. 2 is an example of a display for multi-user commissioning according to one or more embodiments of the present disclosure.

FIG. 2 is an example of a display 206 for multi-user commissioning according to one or more embodiments of the present disclosure. In some examples, the display 206 can be displayed on a user interface of a mobile computing device (e.g., mobile computing device 106-1, 106-2, 106-3, 106-4 as referenced in FIG. 1, etc.). In some examples, the display 206 can be utilized to retrieve data (e.g., schematics, configuration data, etc.) relating to the project and/or updating a status of the project, and/or displaying a status of the project.

In some examples, the display 206 can include a header 220. In some examples, the header 220 can display a description of information being displayed on the display 206. For example, the header 220 can display overview when the display 206 is utilized to display a general overview of status information relating to the project. In another example, the header 220 can display a name of a physical controller or project name when the display is utilized to display project information relating to installing the physical controller.

Display 206 can display the general overview of status information relating to the project. For example, the display can include controller status 218. In some examples, the controller status 218 can include status information relating to the installation and configuration of a number of physical controllers. For example, the controller status 218 can include a total quantity of physical controllers relating to a project, a quantity of plant controllers, and/or a quantity of unitary controllers.

In some examples, the display 206 can include a status indicator 212. In some examples, the status indicator 212 can include a graphical representation that indicates a percentage of completion for a selected project or category. For example, the header 220 can be utilized to select a particular project, portion of a project, and/or a particular device of a particular project. In this example, the status indicator 212 can indicate a percentage of completion for the particular project, portion of a project, and/or the particular device of a particular project. In some examples, the header 220 can be utilized to select a particular category. For example, the header 220 can be utilized to select between an installation check category, a wiring check category, a point check category, and a functional check category.

In some examples, the installation check category can include a status, inputs, installation diagrams, installation information, and/or selections related to an installation of a particular device. In some examples, the wiring check category can include status, inputs, wiring diagrams, wiring information, and/or selections related to wiring the particular device. In some examples, the point check category can include status, inputs, diagrams for point tests, point test information, and/or selections relating to performing a point test of the particular device. In some examples, the functional check category can include a status, inputs for performing the functional check as described herein, diagrams for performing the functional check, and/or selections relating to performing the functional check. As described herein, the display 206 can be utilized to track and manage the number of categories.

In some examples, the status indicator 212 can be updated upon completion of a project checklist. For example, the status indicator 212 can be updated to reflect a greater percentage of completion when a project is complete and/or when a portion of the project checklist has been complete. As described herein, the mobile computing device utilized for the display 206 can retrieve data from the distributed database. In some examples, the retrieved data can be utilized to update the status indicator 212. In addition, the mobile computing device can synchronize completion data with the distributed database. By retrieving data and synchronizing completion data, the mobile computing device can utilize the display 206 for displaying the status indicator 212 with real time data. In addition, the distributed database can be accessed by a plurality of additional devices to monitor the completion status of the project.

In some examples, the display 206 can include a test indicator 214. In some examples, the test indicator 214 can include a status of testing performed on physical controllers. As described further herein, a user can input test results into the mobile computing device. The test results that are input into the mobile computing device can be utilized to determine when a test has passed, failed, or was unable to test. In some examples, the test indicator 214 can be synchronized with the distributed database. For example, the test indicator 214 can be updated based on data retrieved from the distributed databased. In another example, the test results that are input into the mobile computing device can be uploaded to the distributed database. In some examples, the display 206 can be utilized to record a number of tests on the physical controller and synchronize results from the number of tests with the distributed database (e.g., remote distributed database, etc.).

In some examples, the display 206 can include a number of selectable functions 216. In some examples, the selectable functions 216 can include, but are not limited to: an overview function, an install function, a point shortcut function, and/or a function shortcut function. In some examples, the selectable functions 216 can be selected by a user to perform a number of functions described herein. For example, the selectable functions 216 can include an install function to install configuration data on to a physical controller. In some examples, the configuration data can be retrieved from the distributed database by the mobile computing device. In some examples, the retrieved configuration data can be utilized to configure the physical controller.

As described herein, the display 206 can be utilized by a user of the mobile computing device to view project status information, perform a number of tests, update a checklist corresponding to the project, and/or retrieve/install configuration data.

Figure 3A:
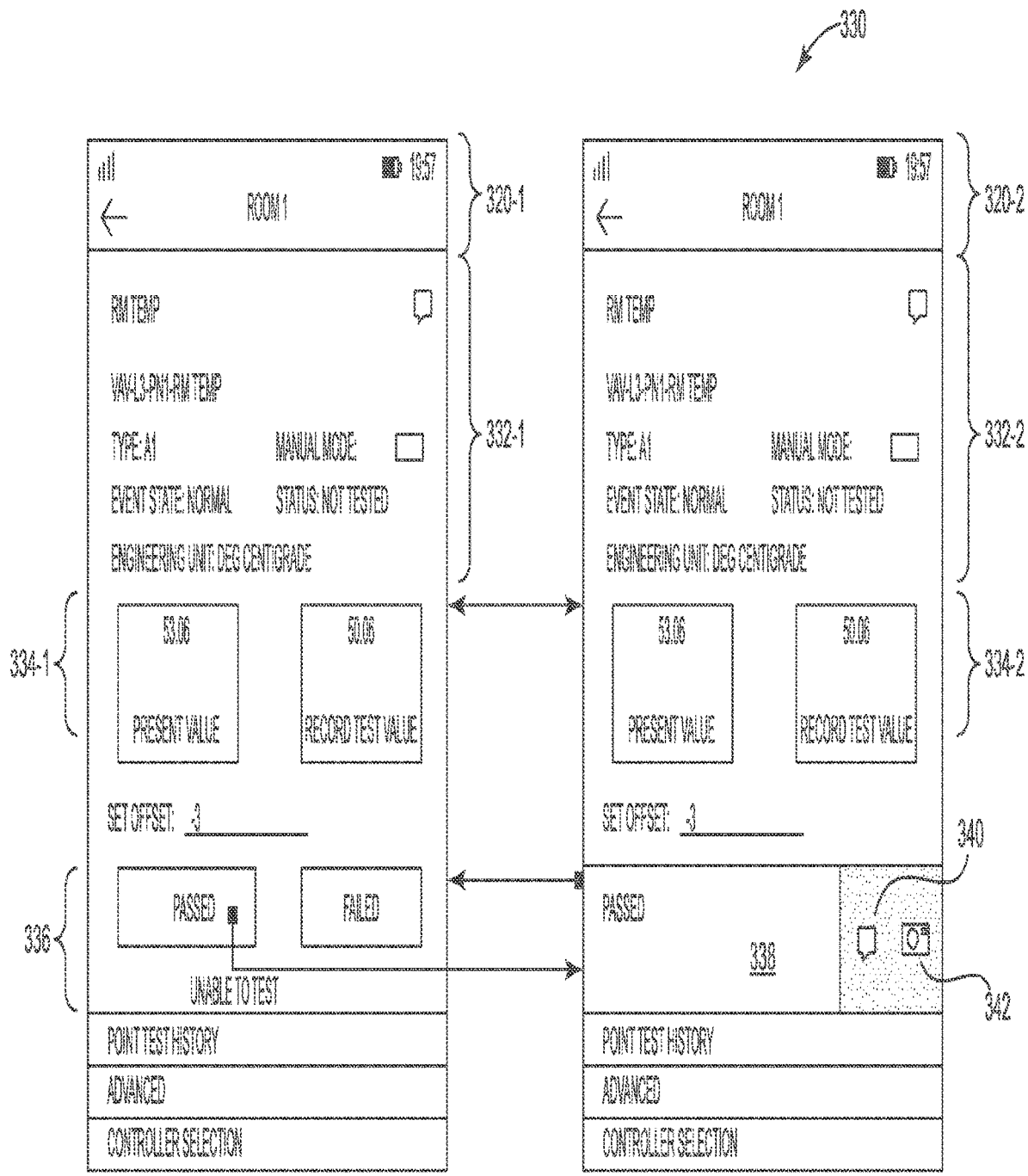
FIG. 3A is an example of displays for multi-user commissioning according to one or more embodiments of the present disclosure.

FIG. 3A is an example of displays 330-1 for multi-user commissioning according to one or more embodiments of the present disclosure. In some examples, the displays 330-1 can be displayed on a user interface of a mobile computing device as described herein. In some examples, the displays 330-1 can be similar to display 206 as referenced in FIG. 2.

In some examples, the displays 330-1 can include a header 320-1, 320-2. In some examples, the header 320-1, 320-2 can display a project and/or device (e.g., physical controller). In some examples, the header 320-1, 320-2 can be utilized to select a particular project and/or portion of a project. For example, a user can utilize the header 320-1, 320-2 to select a project, portion of the project, and/or a particular device to be installed as part of the project. As described herein, selecting a particular project, portion of the project, and/or particular device can display information relating to the selected project, portion of the project, and/or particular device.

In one example, the header 320-1, 320-2 includes a particular device (e.g., VAV box, physical controller, etc.). When a particular device is selected, information 332-1, 332-2 corresponding to the particular device can be displayed. In some examples, the information 332-1, 332-2 can include, but is not limited to: a device name, a serial number, a device type, a mode of the device, a status of the device, a state of the device, and/or a designated user or group of users responsible for the device. As described herein, the information 332-1, 332-2 can be retrieved from the distributed database.

In some examples, the displays 330-1 can include a device test 334-1, 334-2. In some examples, the device test 334-1, 334-2 can include a present value and a record test value. In some examples, the present value can be a value recorded by the selected device from the header 320-1, 320-2. In some examples, the present value can be a value recorded by a physical controller coupled to the selected device from the header 320-1, 320-2. In some examples, a user can input a test value from the site of the selected device from the header 320-1, 320-2. The test value can be a reading from a device other than the physical controller to test the accuracy of the physical controller.

In some examples, the test value can be compared to the present value. In some examples, an offset can be selected based on a determination of an acceptable range of values. For example, a determination can be made that an acceptable range of the comparison consists when the present value is within 3 units (e.g., +/−3 units, etc.) of the test value. In another example, the present value can be a temperature reading determined by a physical controller coupled to variable air volume (VAV) box and the test value can be a reading determined by a user at the location of the VAV box. In this example, the acceptable range can be a difference of plus or minus 3 degrees to ensure that readings from the physical controller can be utilized to identify when a malfunction has occurred with the VAV box.

In some examples, a pass/fail input 336 can be utilized to select when a particular controller has passed or failed based on whether the compared value is within the acceptable range and/or offset. For example, when the compared value is within the acceptable range, pass can be selected from the pass/fail input 336. In this example, selecting pass from the pass/fail input 336 can result in a pass indication 338 to be displayed. In some examples, the pass indication 338 can be synchronized with the distributed database as described herein.

In some examples, the displays 330-1 can be utilized to automatically calculate and/or enter an offset value from a measured value. In some examples, the displays 330-1 can be utilized to display a value from a controller coupled to a device such that the displayed value can be automatically calibrated to match a field measured value.

In some examples, the displays 330-1 can include a text input 340. In some examples, the text input 340 can be utilized to add comments to the data corresponding to the selected device displayed in the header 320-2. In some examples, the comments added via the text input 340 can be synchronized with the distributed database. Thus, the comments added via the text input 340 can be accessed by a number of other users as described herein. In some examples, the text input 340 can be used to describe test conditions and/or other features unique to the selected device.

In some examples, the displays 330-1 can include an image input 342. The image input 342 can be utilized to add images to the data corresponding to the selected device displayed in the header 320-2. In some examples, the images added via the image input 342 can be synchronized with the distributed database. Thus, the images added via the image input 342 can be accessed by a number of other users as described herein.

As described herein, the displays 330-1 can be displayed on a mobile computing device and enable a user of the mobile computing device to retrieve information relating to a project, portion of a project, and/or device. In addition, the displays 330-1 can be utilized to perform a number of tests relating to the project and/or device. As described herein, the information and/or data relating to the project can be updated and synchronized with the distributed database.

Figure 3B:
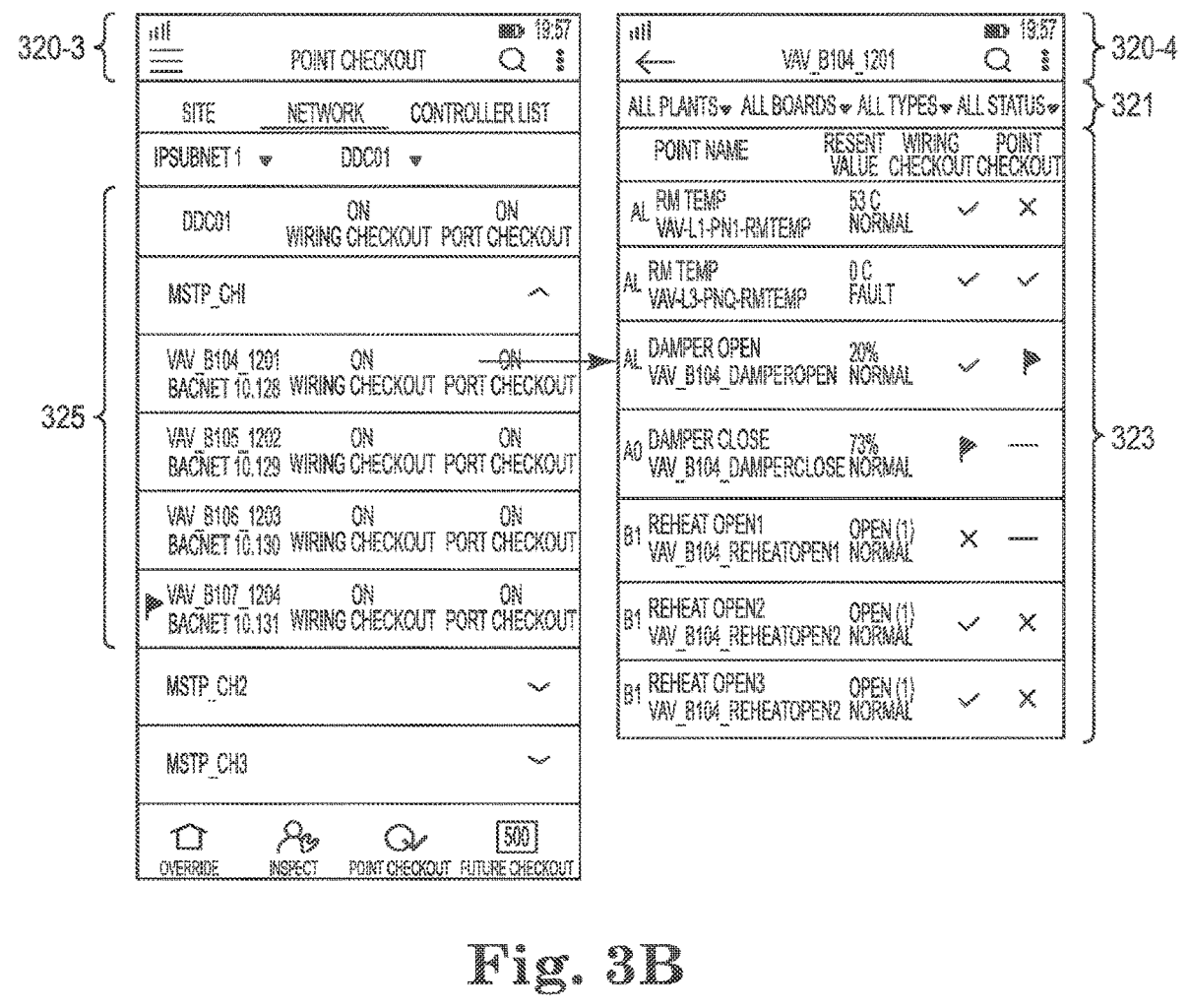

FIG. 3B is an example of displays 330-2 for multi-user commissioning according to one or more embodiments of the present disclosure. In some examples, the displays 330-2 can include similar selection items as the displays 330-1 referenced in FIG. 3A. In some examples, the displays 330-2 can be displayed on a user interface of a mobile computing device as described herein. In some examples, the displays 330-2 can be displayed upon selection of a controller selection tab from the displays 330-1 referenced in FIG. 3A.

In some examples, the displays 330-2 can be utilized to display a filtering of controllers within a building or area. In some examples, the displays 330-2 can be utilized to filter the controllers based on a building, facility, area, network layout of an area, a controller type, and/or a controller name. In some examples, the left display from the displays 330-2 can be utilized to select a particular controller from the filtered controllers. In response to selecting a particular controller from the left display can initiate the right display from the displays 330-2. In some examples, the right display can include a summary list of points for the selected controller. In some examples, the right display can be utilized to display current values for the list of points. In some examples, the right display can view current values, wiring checkout category information, and/or point checkout status information as described herein.

In some examples, the displays 330-2 can include a header 320-3, 320-4 to display a controller name or category of controllers. For example, the header 320-3 on the left display can include a selection for a type of categorization of the controllers for an area or building. In some examples, the header 320-3 can include the number of categories described herein. For example, the header 320-3 can include a number of selections corresponding to the number of categories and a list of controllers 325 can be displayed based on the selection of the corresponding category. For example, the header 320-3 can include a site category, a network category, and/or a controller list category. In some examples, the header 320-3 can include additional or fewer categories.

In some examples, a user can select a particular controller from the list of controllers 325 and the right display can be displayed to the user. In some examples, the right display can include a header 320-4 to display the controller selected by a user from the left display. In some examples, the right display can include a filter selection 321 to filter the value points for the selected controller. In some examples, the right display can include a list of points 323. In some examples, the list of points 323 can include current values for each point, wiring checkout status for each point, and/or point checkout status information for each point.

Figure 3C:
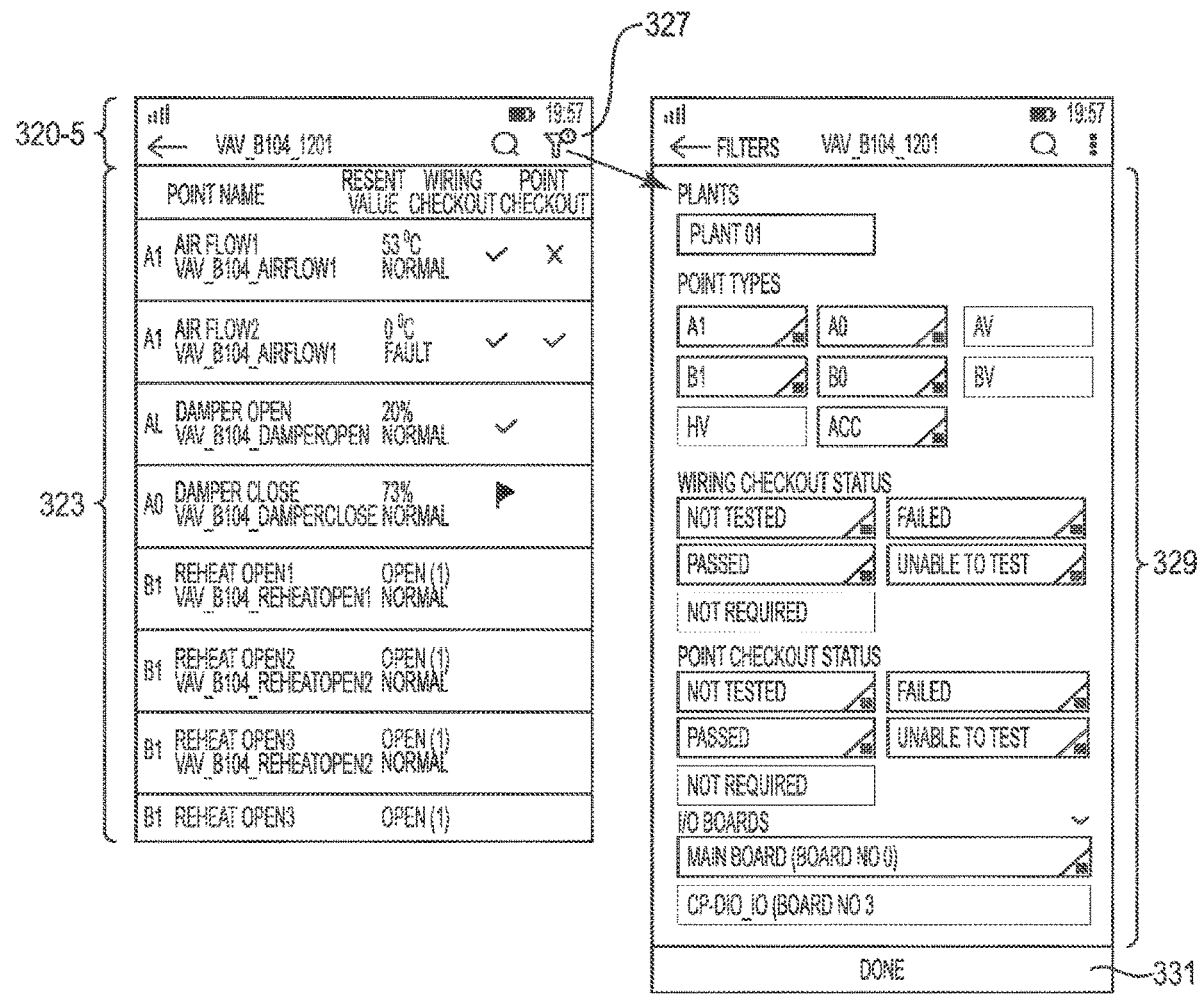
FIG. 3C is an example of displays for multi-user commissioning according to one or more embodiments of the present disclosure.

FIG. 3C is an example of displays 330-2 for multi-user commissioning according to one or more embodiments of the present disclosure. In some examples, the displays 330-3 can include similar selection items as the displays 330-1 referenced in FIG. 3A. In some examples, the displays 330-3 can be displayed on a user interface of a mobile computing device as described herein. In some examples, the displays 330-3 can be displayed upon selection of a controller selection tab from the displays 330-1 referenced in FIG. 3A. In some examples, the left display can be the same or similar display as the right display from FIG. 3B.

In some examples, the left display can include a header 320-5 to display the controller selected by a user from the left display. In some examples, the left display can include a filter selection to filter the value points for the selected controller. In some examples, the left display can include a list of points 323. In some examples, the list of points 323 can include current values for each point, wiring checkout status for each point, and/or point checkout status information for each point.

In some examples, the header 320-5 can include a filter selection 327. In some examples, the filter selection 327 can be selected to display the right display. In some examples, the right display can include a number of filter options 329. The filter options 329 can include a number of options for filtering displayed points on the left display. In some examples, a user can select a point from the list of points 323 to display the displays 330-1 as referenced in FIG. 3A.

In some examples, the filter options 329 can include a plants selection to select or display a particular area, building, or project. In some examples, the filter options 329 can include a number of point type selections to define a particular point type or point types to display on the list of points 323. In some examples, the filter options 329 can include a wiring checkout status to display controllers with a particular wiring checkout status on the list of points 323. In some examples, the filter options 329 can include the point checkout status to display controllers with a particular checkout status on the list of points 323. In some examples, the filter options 329 can include a board selection to display controllers with a particular system board. In some examples, the selected filter options can be implemented on the list of points 323 by selecting a done button 331.

Figure 4:
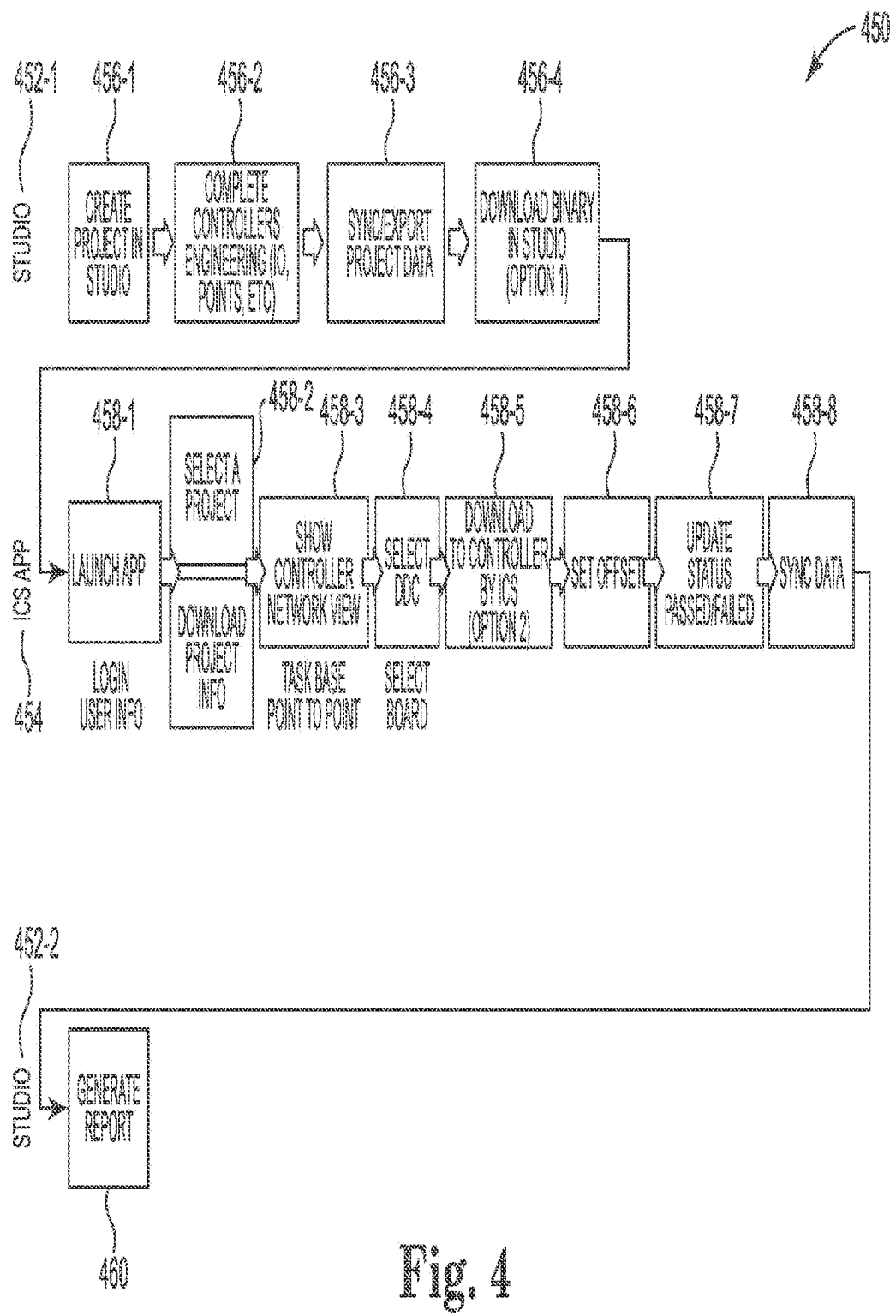
FIG. 4 is an example of a method for multi-user commissioning according to one or more embodiments of the present disclosure.

FIG. 4 is an example of a method 450 for multi-user commissioning according to one or more embodiments of the present disclosure. In some examples, the method 450 can be performed by a number of computing devices as described herein. For example, a first computing device can execute studio instructions 452-1, 452-2 and a second computing device can execute ICS APP instructions 454. In some examples, the second computing device can be a mobile computing device that can execute the ICS APP instructions 454 to perform a portion of the method 450.

In some examples, the method 450 can include creating a project in studio at 456-1. As used herein, studio is a user interface of a computing device for inputting data relating to a number of projects. For example, a project can include an installation of a heating, ventilation, and air conditioning (HVAC) system. In this example, the project can include data and information for completing the installation of the HVAC system. As described herein, the data and information can include schematics for installing devices associated with the HVAC system, instructions for installing physical controllers, and/or configuration data for the physical controllers.

In some examples, the method 450 can include completing controllers engineering at 456-2. In some examples, completing controllers engineering can include identifying a location to install a plurality of physical controllers. In some examples, completing controllers engineering can include generating configuration data for a plurality of physical controllers.

In some examples, the method 450 can include synchronizing/exporting project data at 456-3. As described herein, data corresponding to the project can be synchronized with a distributed database such that a plurality of mobile computing devices can simultaneously display and update information corresponding to the project. In some examples, the data can be exported to a plurality of mobile computing devices using two-way communication. In some examples, a cloud network can be utilized to synchronize the distributed database with a plurality of mobile computing devices.

In some examples, the method 450 can include downloading binary configuration data at 456-4. In some examples, downloading binary configuration data can include downloading instructions that can be installed on to a physical controller. In some examples, the binary configuration data can configure a physical controller such that the controller functions under designated conditions.

In some examples, the method 450 can include launching the application on a mobile computing device at 458-1. Launching the application on a mobile computing device can include opening ICS APP instructions 454 as described herein. In some examples, the application can include a user interface/display as described herein. For example, the application can be utilized to display a status of the project, perform a number of tests, and/or synchronize data with the distributed database.

In some examples, the method 450 can include selecting a project and/or downloading project information at 458-2. As described herein, the application on the mobile computing device can be utilized to select a project via a header displayed via the application. In some examples, the application of the mobile computing device can download project information such as project schematics, wiring instructions, and/or other information relating to completion of the project.

In some examples, the method 450 can include showing controller network view at 458-3. In some examples, showing controller network view can include displaying a network view of a plurality of physical controllers related to a particular project. In some examples, the controller network view can be based on information downloaded at 458-2.

In some examples, the method 450 can include selecting a DDC board at 458-4. In some examples, selecting the DDC board can include selecting a particular device as described herein. In some examples, selecting the DDC board can be based on a particular controller to be configured as described herein.

In some examples, the method 450 can include downloading to controller by ICS APP at 458-5. In some examples, the mobile computing device can download the binary configuration data at the location of a particular controller to be configured. As described herein, the binary configuration data can be installed on a physical controller for configuration of the controller.

In some examples, the method 450 can include setting an offset at 458-6. As described herein, the offset can be a quantity of units that a controller reading can be different than a test performed. For example, the offset can be utilized to ensure that the physical controller is within a particular range of accuracy. In some examples, the offset can be utilized to control a sensitivity and/or accuracy of the controller readings.

In some examples, the method 450 can include updating status of the controller at 458-7. In some examples, updating the status of the controller can include receiving a reading from the controller and comparing the reading to a test value. In this example, the controller can have a pass rating when the difference between the received reading and test value are within the offset. In this example, the controller can have a fail rating when the difference between the received reading and the test value are outside the offset.

In some examples, the method 450 can include synchronizing the data at 458-8. As described herein, synchronizing the data can include synchronizing updated data from the mobile computing device with the distributed database. In some examples, the data can include a pass/fail rating, text data relating to the pass/fail rating, a number of images relating to the pass/fail rating, and/or a confirmation that a particular project or portion of the project has been completed.

In some examples, the method 450 can include generating a report in studio at 460. In some examples, generating the report in studio can include utilizing the data from the ICS APP 454 to generate a report of the progress on the project. In some examples, generating the report can include updating the distributed database. In some examples, updating the distributed database can include updating the project status on a plurality of mobile computing devices coupled to the distributed database.

Figure 5:
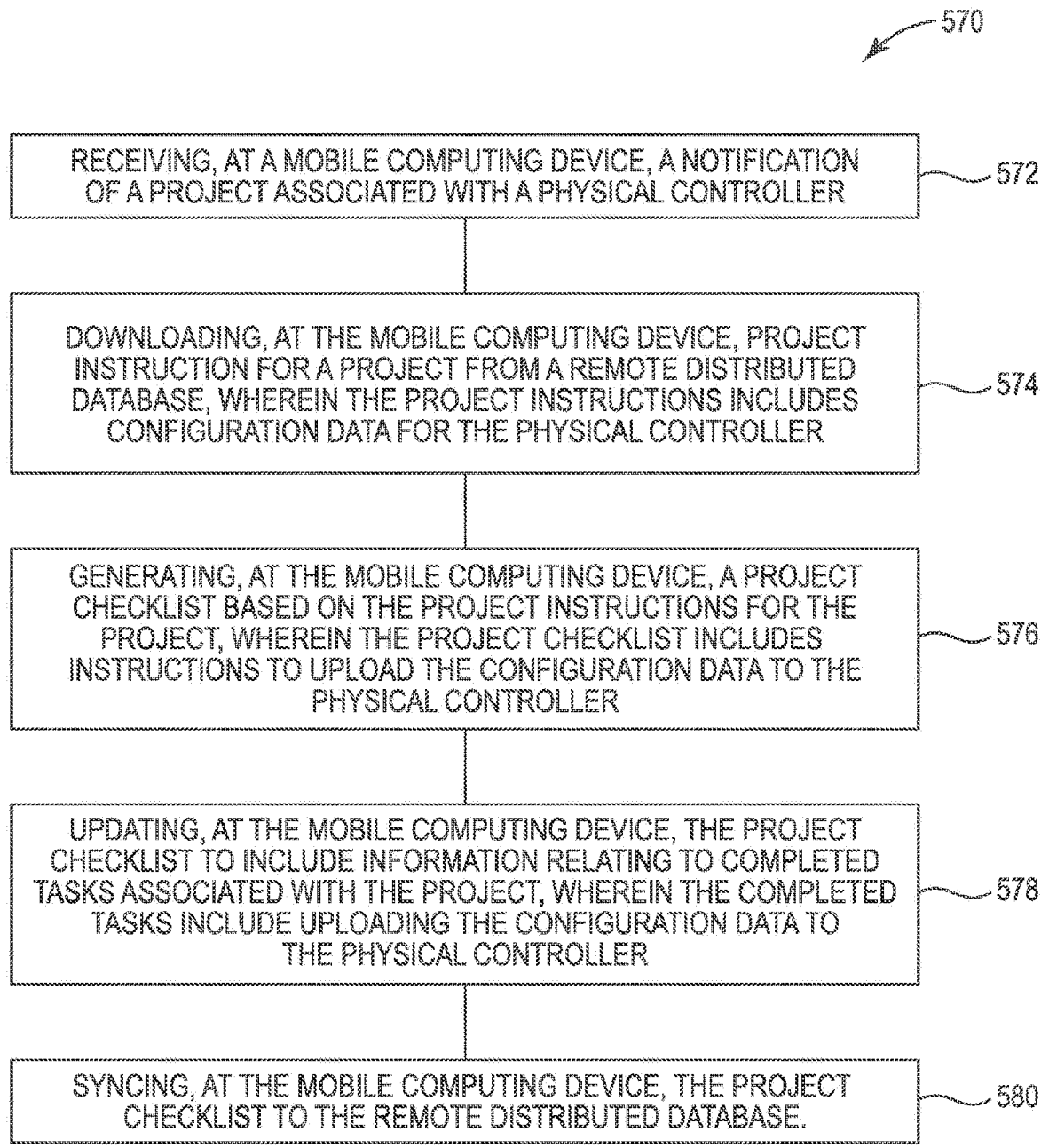
FIG. 5 is an example of a method for multi-user commissioning according to one or more embodiments of the present disclosure.

FIG. 5 is an example of a method 570 for multi-user commissioning according to one or more embodiments of the present disclosure. In some examples, the method 570 can be executed by a computing device. For example, the method 570 can be executed by a mobile computing device such as a smartphone or tablet.

At 572, the method 570 can include receiving, at a mobile computing device, a notification of a project associated with a physical controller. In some examples, receiving the notification of the project can include a message received from a distributed database that a user of the mobile computing device is assigned a particular project. In some examples, the project can include an installation or test of the physical controller. In some examples, the notification can include a description of the project and a location of the physical controller.

At 574, the method 570 can include downloading, at the mobile computing device, project instructions for the project from a remote distributed database, wherein the project instructions includes configuration data for the physical controller. As described herein, data relating to the project can be downloaded by the mobile computing device. In some examples, the data relating to the project can include project instructions (e.g., wiring diagrams, location of installation, etc.). In some examples, the data relating to the project can include configuration data that can be utilized for configuring the physical controller. For example, the configuration data can include binary configuration data that can be installed on the physical controller via the mobile computing device.

At 576, the method 570 can include generating, at the mobile computing device, a project checklist for the project based on the project instructions for the project, wherein the project checklist includes instructions to upload the configuration data to the physical controller. In some examples, the project checklist can include tasks to complete for proper installation and testing of the physical controller. In some examples, the project checklist can include an option for a project check out (e.g., tasks to complete before indicating the project is complete). In some examples, the project checklist can include a number of inputs for indicating that a particular task has been complete. In some examples, the project checklist can also include a number of inputs for testing the physical controller as described herein.

At 578, the method 570 can include updating, at the mobile computing device, the project checklist to include information relating to completed tasks associated with the project, wherein the completed tasks include uploading the configuration data to the physical controller. In some examples, updating the project checklist can include receiving inputs, at the mobile computing device, to indicate test results and/or completion of particular tasks associated with the project.

At 580, the method 570 can include synchronizing, at the mobile computing device, the project checklist with the remote distributed database. As described herein, the mobile computing device can be utilized to synchronize updated data with the remote distributed database. For example, the project checklist can be completed and tests can be performed to confirm correct configuration of the physical controller. In this example, the updated data can be synchronized with the remote distributed database such that progress of the project can be tracked.

In some examples, the method 570 can include displaying, on a display of the mobile computing device, the generated project checklist. As described herein, the project checklist can include a plurality of steps or actions to be performed prior to completing the project. In some examples, the project checklist can be displayed on the user interface of the mobile computing device such that a user can input selections when the user has completed a particular step or action of the project checklist. For example, the method 570 can include receiving inputs, at the display of the mobile computing device, corresponding to the project checklist upon completion of tasks associated with the project.

In some examples, the method 570 can include calibrating the physical controller by uploading the configuration data to the physical controller. As described herein, the mobile computing device can download binary configuration data that can be uploaded or installed on the physical controller. The configuration data can be utilized to configure the physical controller.

In some examples, the method 570 can include altering, at the mobile computing device, a number of functional settings for the physical controller. In some examples, the mobile computing device can be utilized to alter functional settings of the physical controller. For example, the mobile computing device can be utilized to activate and/or deactivate the physical controller. In another example, the mobile computing device can be utilized to activate and/or deactivate particular features of the physical controller.

Figure 6:
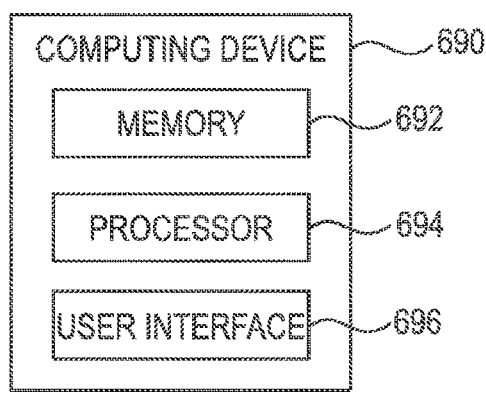
FIG. 6 is an example of a computing device for multi-user commissioning according to one or more embodiments of the present disclosure.

FIG. 6 is an example of a computing device 690 for multi-user commissioning according to one or more embodiments of the present disclosure. Computing device 690 can be, for example, a commodity server, a data center that comprises a plurality of servers, among other types of computing devices or embedded system. Computing device 690 can be utilized in system 102, display 206 and 330, and/or methods 450 and 570 to perform the functions previously described herein. For example, computing device 690 can be included in a mobile device such as mobile computing device 160 as referenced in FIG. 1.

As shown in FIG. 6, computing device 690 includes a memory 692 and a processing resource 694 (e.g., processor) coupled to memory 692. Memory 692 can be any type of storage medium that can be accessed by processing resource 694 to perform various examples of the present disclosure. For example, memory 692 can be a non-transitory computer readable medium having computer readable instructions (e.g., computer program instructions) stored thereon that are executable by processing resource 694 to perform localizing a fault on a live cable in accordance with one or more embodiments of the present disclosure.

Memory 692 can be volatile or nonvolatile memory. Memory 692 can also be removable (e.g., portable) memory, or non-removable (e.g., internal) memory. For example, memory 692 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 692 is illustrated as being located in computing device 690, embodiments of the present disclosure are not so limited. For example, memory 692 can also be located internal to another computing resource (e.g., enabling computer readable instructions to be downloaded over the Internet or another wired or wireless connection).

As shown in FIG. 6, computing device 690 can also include a user interface 696. User interface 696 can include, for example, a display (e.g., a screen). The display can be, for instance, a touch-screen (e.g., the display can include touch-screen capabilities). User interface 696 (e.g., the display of user interface 696) can provide (e.g., display and/or present) information to a user of computing device 690.

Additionally, computing device 690 can receive information from the user of computing device 690 through an interaction with the user via user interface 696. For example, computing device 690 (e.g., the display of user interface 696) can receive input from the user via user interface 696. The user can enter the input into computing device 690 using, for instance, a mouse and/or keyboard associated with computing device 690, or by touching the display of user interface 696 in embodiments in which the display includes touch-screen capabilities (e.g., embodiments in which the display is a touch screen).

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for managing a multi-user project that uses multiple users for installing and commissioning a plurality of physical controllers of a Heating, Ventilation and/or Air Conditioning (HVAC) system of a building after a predefined physical installation location in the building and one or more pre-configured configuration files for each of the plurality of physical controllers of the HVAC system are predefined and stored in a remote database, the system comprising:
   a plurality of mobile computing devices each corresponding to a different user of the multiple users of the multi-user project, each of the plurality of mobile computing devices comprising computer readable instructions stored thereon that are executable by a processor that cause the respective mobile computing device to:
      identify one of the plurality of physical controllers of the HVAC system of the building;
      establish a first communication path to the remote database;
      instruct the respective user to install the identified one of the plurality physical controllers at the predefined physical installation location in the building as specified for the identified one of the plurality physical controllers in the remote database;
      download one or more of the pre-configured configuration files for the identified one of the plurality of physical controllers of the HVAC system of the building from the the remote database to the mobile computing device over the first communication path;
      establish a second communication path to communicate with the identified one of the plurality of physical controllers of the HVAC system of the building;
      after the identified one of the plurality physical controllers of the HVAC system of the building is installed at the predefined physical installation location in the building, install the one or more pre-configured configuration files for the identified one of the plurality of physical controllers on the identified one of the plurality of physical controllers via the second communication path;
      receive data from the identified one of the plurality of physical controllers, wherein the data is associated with a pass/fail status for the installation of the identified one of the plurality of physical controllers after the one or more pre-configured configuration files are installed on the identified one of the plurality of physical controllers of the HVAC system of the building;
      upload the data associated with the pass/fail status for the installation of the identified one of the plurality of physical controllers to the remote database, wherein the remote database maintains a pass/fail status for each of the plurality of physical controllers of the multi-user project based on the data received from the plurality of mobile computing devices to track progress of the multi-user project.

2. The system of claim 1, wherein the first communication path and the second communication path each includes a wireless communication path.

3. The system of claim 1, wherein the instructions are executable by the processor to receive an installation checklist for a proper installation and testing of the identified one of the plurality of physical controllers, wherein the installation checklist includes a plurality of tasks including a task related to installing the one or more pre-configured configuration files on the identified one of the plurality of physical controllers.

4. The system of claim 3, wherein the plurality of tasks of the installation checklist includes a wiring checkout task to be performed by the user of the mobile computing device on the identified one of the plurality of physical controllers.

5. The system of claim 3, wherein the plurality of tasks of the installation checklist includes a sensor calibration task to be performed by the user of the mobile computing device.

6. The system of claim 3, wherein the plurality of tasks of the installation checklist includes a validation of test results task to be performed by the user of the mobile computing device.

7. The system of claim 3, wherein the instructions are executable by the processor to receive inputs, via a user interface of the mobile computing device, to indicate completion of corresponding ones of the plurality of tasks of the installation checklist.

8. The system of claim 7, wherein the instructions are executable by the processor to upload an indication of the completed tasks to the remote database.

9. A method for managing a multi-user project that uses multiple users for installing and commissioning a plurality of physical controllers of an HVAC system of a building after a physical installation location, one or more pre-configured configuration files, and an installation checklist for a proper installation and testing including a wiring checkout task for each of the plurality of physical controllers of the HVAC system are predefined and stored in a database, wherein each user of the multiple users of the multi-user project has a corresponding mobile device of a plurality of mobile devices, the method comprising:
   for each of the plurality of physical controllers of the HVAC system of the building:
      receiving at a mobile device of a respective user of the multiple users, the installation checklist for the proper installation and testing of the corresponding one of the plurality of physical controllers;
      downloading and displaying on the mobile device the predefined physical installation location for the corresponding one of the plurality of physical controllers;
      the respective user of the mobile device installing the corresponding one of the plurality of physical controllers at the predefined physical installation location for the corresponding one of the plurality of physical controllers;
      after the corresponding one of the plurality physical controllers is installed at the predefined physical installation location in the building, the respective user of the mobile device performing the wiring checkout task on the corresponding one of the plurality of physical controllers;

downloading one or more of the pre-configured configuration files associated with the corresponding one of the plurality of physical controllers from the database to the mobile device;

installing from the mobile device to the corresponding one of the plurality of physical controllers of the HVAC system the one or more downloaded pre-configured configuration files;

after the one or more configuration files are installed on the corresponding one of the plurality of physical controllers of the HVAC system, receiving at the respective mobile device data associated with a pass/fail status for the installation of the corresponding one of the plurality of physical controllers; and uploading from the mobile device to the database the data associated with the pass/fail status for the installation of the corresponding one of the plurality of physical controllers, wherein the database maintains a pass/fail status for each of the plurality of physical controllers of the multi-user project based on the data received from the plurality of mobile devices to track progress of the multi-user project.

10. The method of claim 9, wherein the one or more pre-configured configuration files include one or more binary configuration files.

11. The method of claim 9, wherein the installation checklist includes a plurality of tasks including a task related to installing the one or more pre-configured configuration files on the corresponding one of the plurality of physical controllers.

12. The method of claim 11, wherein the wiring checkout task includes instructions for wiring the corresponding physical controller of the plurality of physical controllers.

13. The method of claim 11, wherein the plurality of tasks of the installation checklist includes a sensor calibration task to be performed by the respective user of the mobile device.

14. The method of claim 11, wherein the plurality of tasks of the installation checklist includes a validation of test results task to be performed by the respective user of the mobile device.

15. The method of claim 11, further comprises receive inputs from the respective user, via a user interface of the mobile device, that indicate completion of corresponding ones of the plurality of tasks of the installation checklist.

16. The method of claim 15, further comprising uploading an indication of the completed tasks to the database.

17. A system for managing a multi-user project that uses multiple users for installing and commissioning a plurality of physical controllers of a HVAC system of a building after a physical installation location in the building and one or more pre-configured configuration files for each of the plurality of physical controllers of the HVAC system of the building are predefined and stored in a database, the system comprising:

a computing device hosting the database;

a plurality of mobile devices each corresponding to a different user of the multiple users of the multi-user project, each of the plurality of mobile computing devices in operative communication with the computing device, each of the plurality of mobile devices including a user interface and is configured to:

allow a user of the mobile device to select one of the plurality of physical controllers of the HVAC system of the building via the user interface of the mobile device;

download one or more of the pre-configured configuration files associated with the selected one of the plurality of physical controllers of the HVAC system from the database hosted on the computing device;

install the one or more downloaded pre-configured configuration files to the selected one of the plurality of physical controllers;

after the one or more pre-configured configuration files are installed on the selected one of the plurality of physical controllers, receive data associated with a status of the commissioning of the selected one of the plurality of physical controllers, the status of the commissioning of the selected one of the plurality of physical controllers including a percentage of completion for commissioning the selected one of the plurality of physical controllers;

upload to the database the data associated with the status of the selected one of the plurality of physical controllers; and wherein the computing device is configured to receive the data associated with the status of commissioning of each of the plurality of physical controllers and to determine a composite completion status for all of the plurality of physical controllers.

18. The system of claim 17, wherein the mobile device is further configured to:

receive an installation checklist from the database for a proper installation and testing of the selected one of the plurality of physical controllers;

receive inputs, via the user interface of the mobile device, that indicate completion of corresponding ones of the plurality of tasks of the installation checklist; and uploading an indication of the completed tasks to the database.

* * * * *